United States Patent [19]

Longobardi

[11] Patent Number: 4,715,354

[45] Date of Patent: Dec. 29, 1987

[54] FUEL-ECONOMY AND EMISSION-CONTROL DEVICE FOR INTERNAL COMBUSTION ENGINES

[76] Inventor: Roberto Longobardi, Viale Europa, 2/E, Castellammare di Stabia, 80053, Italy

[21] Appl. No.: 862,224

[22] PCT Filed: Jul. 30, 1985

[86] PCT No.: PCT/IT85/00023

§ 371 Date: Apr. 3, 1986

§ 102(e) Date: Apr. 3, 1986

[87] PCT Pub. No.: WO86/01258

PCT Pub. Date: Feb. 27, 1986

[30] Foreign Application Priority Data

Aug. 3, 1984 [IT] Italy ............................... 40426 A/84

[51] Int. Cl.[4] ............................................. F02M 29/00
[52] U.S. Cl. ..................................... 123/590; 48/180.1
[58] Field of Search ............... 123/574, 590; 48/180.1, 48/189.1, 189.4

[56] References Cited

U.S. PATENT DOCUMENTS

| | | | |
|---|---|---|---|
| 1,701,607 | 2/1929 | Brinton, Jr. | 48/189.4 |
| 1,780,130 | 10/1930 | Heard | 48/189.4 |
| 1,818,471 | 8/1931 | Geauque | 48/189.4 |
| 3,973,534 | 8/1976 | Amos | 123/574 |
| 4,123,233 | 10/1978 | Mannino | 48/189.4 |
| 4,285,320 | 8/1981 | Webster et al. | 123/590 |

FOREIGN PATENT DOCUMENTS

| | | | |
|---|---|---|---|
| 2386691 | 11/1978 | Fed. Rep. of Germany . | |
| 773115 | 4/1957 | United Kingdom . | |
| 2083860 | 3/1982 | United Kingdom | 123/590 |

*Primary Examiner*—E. Rollins Cross
*Attorney, Agent, or Firm*—Darby & Darby

[57] ABSTRACT

A device is disclosed for use in conjunction with the carburetor of an internal combustion engine for economizing fuel consumption and reducing emission levels. The device includes a mixer element in the form of a spiralling cone frustum, seated in a mounting plate which is provided with a radial bore designed to admit air or other liquid or gas into the inlet manifold.

7 Claims, 8 Drawing Figures

FUEL-ECONOMY AND EMISSION-CONTROL DEVICE FOR INTERNAL COMBUSTION ENGINES

The invention relates to a device which, incorporated into the carburetors of internal combustion engines, economizes fuel consumption and controls pollution caused by exhaust emission.

The prior art embraces a number of devices designed to cut fuel consumption of and/or reduce pollution caused by internal combustion engines. Generally speaking, such devices are complex and costly; they call for extensive modification of the carburetors of production engines, they cannot always be utilized for given types of carburetor, and finally, results produced are not always wholly satisfactory.

The object of the invention disclosed herein is that of improving on a previous Italian patent filed under No. 48838A/77 on 5th Apr. 1977 by the same applicant, through the incorporation of inventive steps which are designed to enhance operation of the device to which the existing patent relates.

The improved device is one providing fuel-economy and emission-control, designed for use with any type of carburetor or other type of fuel intake system, and possesses the essential features of being remarkably simple in construction, efficient, and relatively inexpensive to manufacture.

The device consists, in essence, of a tapered spiral mixer element, and of means for mounting such an element between the carburetor and inlet manifold, or cylinder head, of an internal combustion engine. The mixer element itself is supported by a mounting flange embodied in insulating material (or in other material) and drilled through from the side in order to allow passage into the manifold of additional air, and of gases and vaporized oil produced during blow-by, which contain highly polluting substances that are duly recycled.

The intake of air and gases comes about by distinct stages. At first, air drawn in via the cleaner and gases drawn in via the blow-by system are channelled into a by-pass fitting having a setscrew; the channelled air and gases flow through the by-pass to a solenoid-operated metering valve, which is integral with the by-pass; the stream is then directed into a solenoid-operated cleaner valve fitted with an internal filter element; from this valve, the air and gases ultimately reach the aforesaid mounting flange, which is located between the carburetor and inlet manifold.

The invention will now be described in detail, by way of example, with the aid of the accompanying drawings in which.

Figure 1:
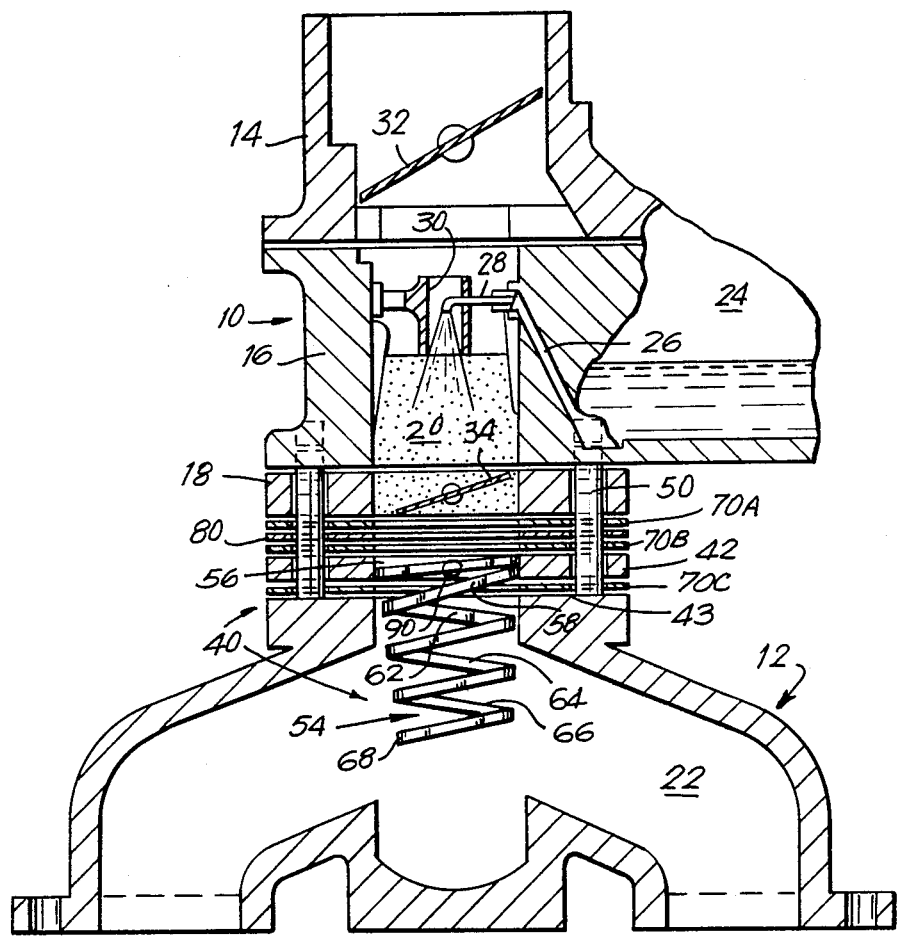
FIG. 1 is a section through the carburetor of an internal combustion engine incorporating a component of the device disclosed.

With reference to FIG. 1, 10 denotes the carburetor assembly of an internal combustion engine, mounted to the inlet manifold 12 of such an engine.

24 denotes the carburetor float chamber, which is connected by way of a passage 26 with the carburetor barrel in order to supply fuel via a jet 28 and a discharge nozzle 30 and bring about its mixture with incoming air in the conventional manner.

A choke flap 32 regulates the amount of air allowed into the barrel 20 of the carburetor, and a throttle valve 34 serves to control the amount of fuel-air mixture flowing through the barrel 20 and into the riser 22 of the inlet manifold 12.

Figure 2:
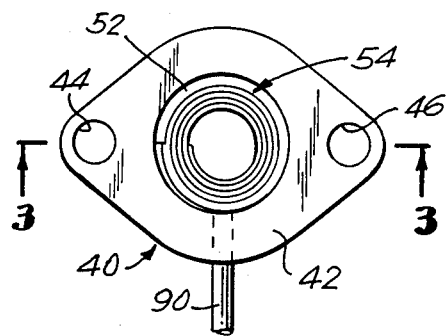
FIG. 2 is a plan from above of the mixer element with its mounting flange, and a small bore tube embodied in copper (or other material) which projects from the mounting.
Figure 3:
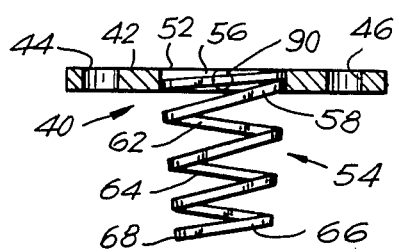
FIG. 3 is the section through 3—3 in FIG. 2.

The component denoted 40 in FIGS. 1, 2 & 3 constitutes an essential part of the fuel-economy and emission control device to which the invention relates, and comprises a mounting flange 42 exhibiting the same shape as the relative parts 16 and 18 of the body of the carburetor, and as the surface 43 of the riser of the inlet manifold 12 to which the carburetor is fitted, thereby ensuring a mutual structural compatibility with these parts which will be described more fully on the following pages.

Whilst it is clear that a great variety of materials exists from which to select in embodying the mounting flange 42, it will be preferably that the material in question possess good heat insulation properties. The mounting flange 42 is provided with bolt holes 44 and 46 which, naturally enough, will be of size such as to accommodate the shanks of the respective carburetor mounting bolts 48 and 50 (FIG. 1). The mounting flange 42 is provided further with a bore 90 drilled through radially from one side, which admits air and/or gases (appropriately metered and cleaned by solenoid-operated valves shortly to be described) to the inlet manifold. The mounting flange 42 exhibits a central opening 52 of circular shape which is of size such as to match and align with the barrel 20 of the carburetor 10 and the uppermost extremity of the riser 22, i.e. the two connecting passages through which the air-fuel mixture flows into the inlet manifold 12. It will be observed that the opening 52 tapers slightly from top to bottom, for reasons which will become apparent in due course.

54 denotes the mixer element of the device disclosed herein, and is fashioned from a strip of suitable material, say, metal ribbon, which in a preferred embodiment will exhibit a rectangular cross section. This mixer element 54 is spiralled into what is basically a cone frustum, the first turns 56 and 58 of which serve to anchor the entire spiral; to that end, these first turns are of size and shape such as to ensure their fitting tightly into the tapered opening 52 of the mounting flange 42 and thus prevent separation of the mixer element 54 from the opening. It will be observed that the mixer element comprises a given number of further spiral turns 62, 64 and 66 which decrease gradually in diameter the farther away and down from the mounting flange they are located, the spiral terminating at point 68 which is displaced radially from the axis of the element 54 in such a way that the overall shape produced is that of a spiralling cone frustum. Notwithstanding the drawings show a mixer element 54 having slightly in excess of five spiral turns, it will be appreciated that the ultimate number selected must depend upon the operating characteristics of the carburetor to which the element 54 is ultimately fitted. Moreover, the taper profile of the mixer element 54 might vary for the same reason, though a typical ratio between the diameter of the base turn and that of the terminating turn would be, for instance, 32/25 or thereabouts.

Figure 4:
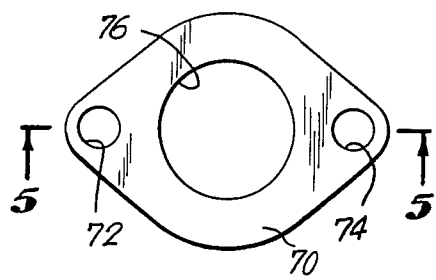
FIG. 4 is a plan of one of the gaskets used in sealing the mounting flange illustrated FIG. 1.
Figure 5:
FIG. 5 is the section through 5—5 in FIG. 4.

FIGS. 4 and 5 show a gasket 70 embodied in any conventional material of a suitable type, which has two holes 72 and 74 for mounting purposes, as well as a central opening 73 through which the fuel-air mixture may pass. The shape and size of the holes and opening matCch those of the mounting flange 42 illustrated in FIG. 2.

Figure 6:
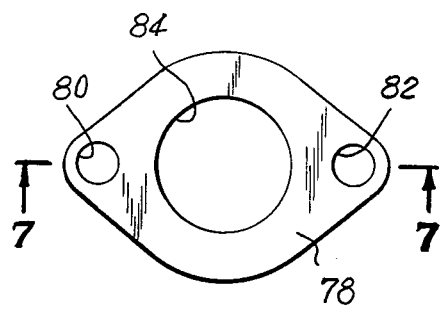
FIG. 6 is the plan of a distance piece fitted in conjunction with the component illustrated in FIG. 1.
Figure 7:
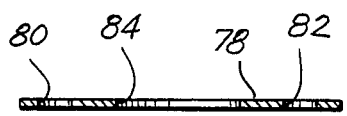
FIG. 7 is the section through 7—7 in FIG. 6.

FIGS. 6 and 7 show a distance piece 78 which, in a preferred embodiment, will be of the same material as the mounting flange 42; like the mounting flange and its gasket, the distance piece is provided with two relative bolt holes 80 and 82, and with a central opening 84 through which the fuel-air mixture passes. The precise number of gaskets and/or distance pieces may vary from application to application of the device disclosed, according to the features and the performance of the carburetor with which it is used; it will be observed, however, that in the case of a typical carburetor as illustrated in FIG. 1, three such gaskets 70A, 70B and 70C are utilized together with one distance piece 78. In the preferred embodiment thus illustrated, the diameter of the opening in the gasket denoted 70B is marginally smaller, say, by one millimeter, than the central opening 52 of the mounting flange 42, in order to ensure that the gasket in question partly overlaps the first spiral turn 56 of the mixer element 54 and retains it firmly in position in the opening 52.

Figure 8:
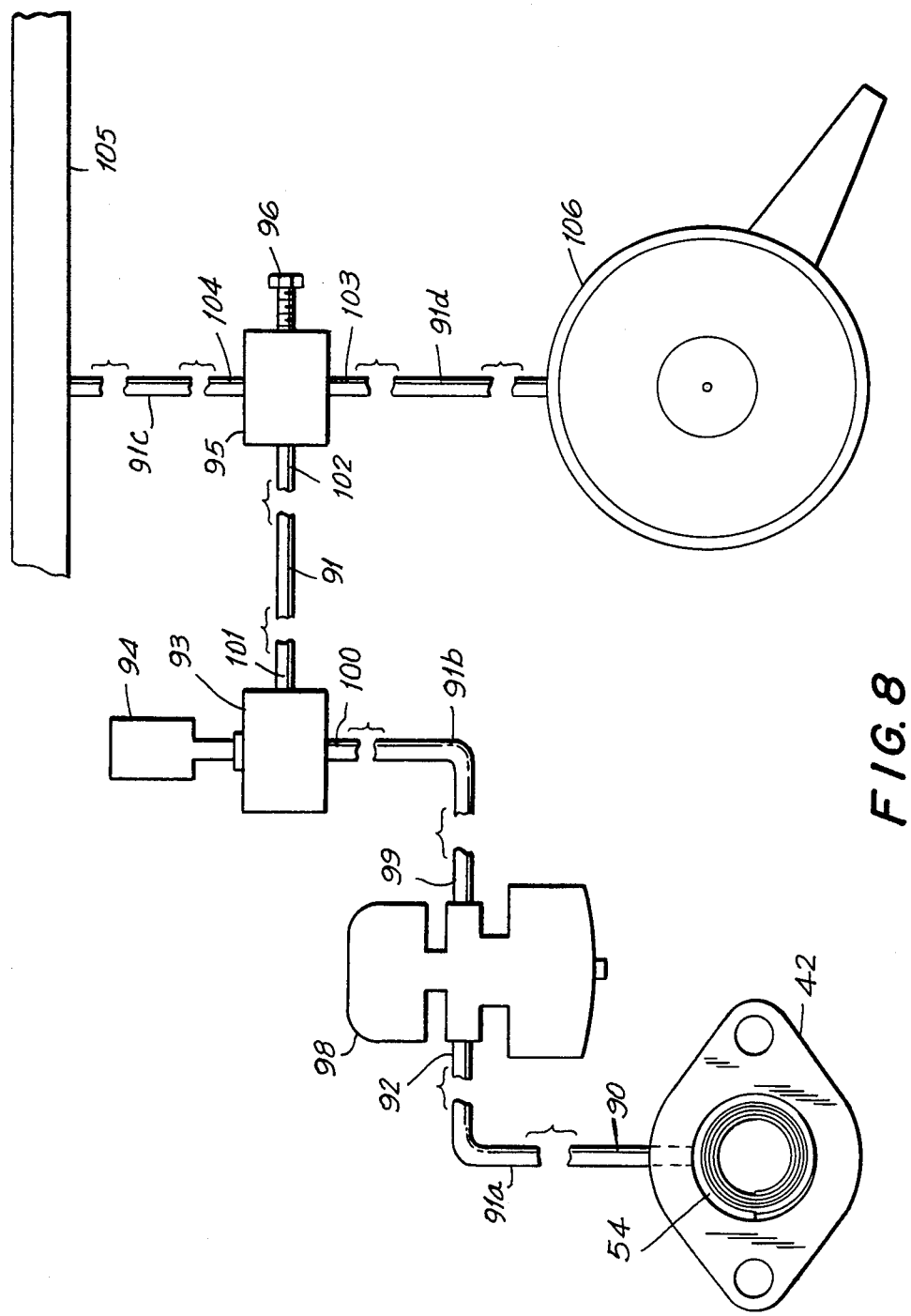
FIG. 8 shows, in partially exploded and partially schematic view, the assembly of the mounting flange connected to external intake means through which a fluid supplied may be directed into the inlet manifold.

With reference to FIG. 8, 90 denotes a small-bore copper tube which admits air drawn in by the air-cleaner 106, and blow-by gases drawn in through the recycle system 105, into the inlet manifold. 91d and 91e denote relative hoses departing from the air-cleaner 106 and the blow-by system 105 and connecting with two relative inlets 103 and 104 of a by-pass fitting 95 provided with a setscrew 96 the purpose of which is to control the flow of air and blow-by gases through an outlet 102 communicating via a further hose 91 with the inlet 101 of a valve mounting 93. The valve 94 in question is a metering valve designed to control the flow of air and gases (or of other liquid or gas stored in an auxiliary reservoir) through an outlet 100 which is connected in turn, via a further hose 91b, with the inlet 99 of a solenoid-operated cleaner valve 98 that filters the air and gases flowing from a relative outlet 92 into a hose 91a connecting with the small-bore tube 90, hence with the mounting flange 42; thus, metered air and gases are channelled into the inlet manifold 12 through the mixer element 54. The solenoids of both the valves operate off a 12 V supply, energization becoming possible once the engine is set running.

The foregoing description will be sufficient for a person skilled in the art to appreciate the type of assembly and operating arrangement envisaged for the device, located thus between the carburetor 10 and the inlet manifold 12 as illustrated in FIG. 1.

Briefly, the element 54 is fitted into the opening 52 of the mounting flange 42 and the entire assembly is duly aligned: gasket 70C, mounting 42 with its mixer element 54, gasket 70B, distance piece 80, gasket 70A and the two parts 18 and 16 of the carburetor body which are bolted to the manifold riser; this being accomplished, hose 91a is connected to the small-bore tube 90 offered by the mounting flange 42. With the entire assembly made fast by tightening the carburetor mounting bolts 48 and 50, the carburetor 10 and the device 40 remain firmly associated with the top of the inlet manifold 12.

In operation, the fuel-economy and emission control device 40 disclosed produces a marked intensification of the mixing action imparted to fuel-and-air flowing down through it from the carburetor 10; a vortex is set up in the mixture as it encounters the spiral turns of the mixer element 54. What is more, such a vortex acts to advantage, bringing about an increase in the velocity at which the mixture abandons the element and flows down through the manifold riser 22 into the engine's combustion chambers. Centripetal forces created by the vortex in the fuel-air mixture following passage through the element 54 are such as to bring about a marked reduction in surface contact between the mixture and hot spots on the inlet manifold 12, a factor which, in conjunction with the heat insulation properties of the mounting flange 42, will reduce the temperature of the fuel-air mixture considerably, hence to advantage.

The overall result of the process thus described is that of producing a more complete combustion of fuel, and a relative increase in engine output per unit of fuel consumed, with corresponding reductions in fuel consumption and in poisonous exhaust emissions.

Bench-testing has demonstrated that with a device as disclosed herein fitted to the carburetor of an internal combustion engine, it is possible to reduce fuel consumption by 25% or thereabouts.

It has also been verified, by tests carried out on standard Ministry of Transport benches, that emission of carbon monoxide (gas of a highly toxic nature) in the exhaust fumes is reduced by as much as 70%, as is the emission of hydrocarbons escaping combustion, and the emission of other poisonous substances.

As already stated in the description, the size and shape of the spiral mixer element 54 may vary from application to application, though for guideline purposes, dimensions would be a rectangular cross section of 0.5×2.5 mm, and helicoidal pitch of ~8 mm In the embodiment described, the device is seen in conjunction with a carburetor having a single float chamber and barrel. Clearly, the device might equally well be utilized with multiple carburetors of a twin barrel or compound type, in which case there will be an opening 52 provided in the mounting flange 42 for each barrel, and a relative mixer element 54 located and operating therein as already described.

What is claimed is:

1. An improved fuel-economy and emission-control device for internal combustion engines, of a type having at least one spiral mixer element, and means for mounting said element downstream of a carburetor and upstream of an inlet manifold internally of an coaxial with a passage through which a fuel-air mixture is directed, wherein the mixer element is a spiral element having a given number of turns which gradually decrease in diameter along the fuel-air mixture passage, and means for mounting the spiral mixer element, said means comprising a mounting flange having a tapered central opening which supports the mixer element, the improvement comprising:

a radial bore coplanar with and passing through the mounting flange so as to communicate with the central opening, through which a fluid supplied by an external intake means may be directed into the central opening and into the inlet manifold, wherein the intake means connected to the radial bore comprises, in turn, a solenoid-operated cleaner valve, a solenoid-operated metering valve, and a bypass valve connected to both an air cleaner and a blow-by system for adding vaporized oil to said fluid, said intake means components being connected and in fluid communication via small-bore hoses.

2. A device as in claim 1, wherein connection to the external intake means is provided by a small-bore tube integral with the radial bore and projecting from the mounting flange.

3. A device as in claim 1, said external intake means further comprising an auxiliary reservoir for providing additional fluids into said inlet manifold.

4. A device as in claim 1 wherein the bypass valve is provided with a setscrew for control of the flow of air and blow-by gases drawn in through the small-bore hoses.

5. A device as in claim 1, wherein the solenoid-operated metering and cleaner valves are adapted to be powered by an electrical system of a vehicle in which such device may be mounted, and are rendered jointly operational when said electrical system is energized.

6. A device as in claim 1 wherein at least one first gasket is located between the mounting flange and the inlet manifold, and at least one second gasket is located between the mounting flange and the carburetor.

7. A device as in claim 1, wherein the intake means connected to the radial bore comprises, in turn, a solenoid-operated cleaner valve, and an auxilliary reservoir adapted to contain an additional fluid to be be supplied into the inlet manifold.

* * * * *